United States Patent
Desbois et al.

(10) Patent No.: US 8,765,902 B2
(45) Date of Patent: Jul. 1, 2014

(54) METHOD FOR THE PRODUCTION OF POLYAMIDES IN EXTRUDERS

(75) Inventors: Philippe Desbois, Edingen-Neckarhausen (DE); Michael Kopietz, Grunstadt (DE); Ralf Neuhaus, Heidelberg (DE); Hagen Stawitzki, Karlsruhe (DE); Hans-Joachim Weis, Speyer (DE); Jochen Engelmann, Singapore (DE)

(73) Assignee: BASF SE, Ludwigshafen (DE)

( * ) Notice: Subject to any disclaimer, the term of this patent is extended or adjusted under 35 U.S.C. 154(b) by 421 days.

(21) Appl. No.: 12/665,585

(22) PCT Filed: Jun. 11, 2008

(86) PCT No.: PCT/EP2008/057273
§ 371 (c)(1),
(2), (4) Date: Dec. 18, 2009

(87) PCT Pub. No.: WO2008/155271
PCT Pub. Date: Dec. 24, 2008

(65) Prior Publication Data
US 2010/0190952 A1   Jul. 29, 2010

(30) Foreign Application Priority Data
Jun. 20, 2007  (EP) .................................... 07110660

(51) Int. Cl.
*C08G 69/28* (2006.01)

(52) U.S. Cl.
USPC ........... 528/288; 524/413; 524/425; 524/447; 524/449; 524/451; 524/496; 524/538; 524/606; 525/432; 528/310; 528/335

(58) Field of Classification Search
CPC ..... C08L 77/00; C08L 77/06; B29C 45/1431; B29C 2045/14868; B29C 51/14; B29C 45/14336; C08J 2329/04; C08J 2367/02; C08J 5/043; C08J 2377/06

USPC ......... 524/413, 425, 447, 449, 451, 496, 606, 524/538; 525/432; 528/310, 335, 288
See application file for complete search history.

(56) References Cited

U.S. PATENT DOCUMENTS

| | | | | |
|---|---|---|---|---|
| 4,617,342 | A | * | 10/1986 | Poppe et al. .................. 524/606 |
| 4,831,108 | A | * | 5/1989 | Richardson et al. .......... 528/335 |
| 6,187,877 | B1 | * | 2/2001 | Gotz et al. ...................... 526/65 |
| 2010/0190934 | A1 | | 7/2010 | Desbois et al. |
| 2011/0092645 | A1 | | 4/2011 | Loth et al. |
| 2011/0144300 | A1 | | 6/2011 | Desbois et al. |

FOREIGN PATENT DOCUMENTS

| | | |
|---|---|---|
| DE | 4329676 A1 | 3/1994 |
| DE | 195 14 145 A1 | 10/1996 |
| EP | 0667367 A2 | 8/1995 |
| EP | 0693515 A1 | 1/1996 |

OTHER PUBLICATIONS

Shah et al (Comparison of the flow in co-rotating and counter-rotating twin screw extruders, pp. 443-447, May 2004, ANTEC).*
U.S. Appl. No. 13/378,980, filed Mar. 1, 2012, Schmidt et al.
U.S. Appl. No. 13/378,980, filed Dec. 16, 2011, Schmidt et al.

* cited by examiner

*Primary Examiner* — Gregory Listvoyb
(74) *Attorney, Agent, or Firm* — Drinker Biddle & Reath LLP

(57) ABSTRACT

In a process for preparing a polyamide based on dicarboxylic acids and diamines in an extruder, a solid mixture comprising a monomer mixture composed of 50 mol % of dicarboxylic acid mixture composed of from 60 to 88 % by weight of terephthalic acid and from 12 to 40% by weight of isophthalic acid, in which up to 20% by weight of the dicarboxylic acid mixture may also be replaced by other dicarboxylic acids, and 50 mol % of hexamethylenediamine which may be up to 20% by weight replaced by other $C_{2\text{-}30}$-diamines, in a corotatory twin-screw extruder for a residence time of from 10 seconds to 30 minutes, is heated to a temperature in the range from 150 to 400° C. while removing steam and if appropriate diamines through venting orifices.

7 Claims, No Drawings

METHOD FOR THE PRODUCTION OF POLYAMIDES IN EXTRUDERS

CROSS REFERENCE TO RELATED APPLICATIONS

This application is a national phase of PCT/EP2008/057273, filed on Jun. 11, 2008 which claims priority to EP 07110660.3 filed Jun. 20, 2007, the entire contents of all are hereby incorporated by reference.

The present invention relates to processes for preparing a polyamide based on dicarboxylic acids and diamines in an extruder.

The preparation of polyamides based on dicarboxylic acids and diamines in an extruder is known in principle. For example, DE-A-195 14 145 describes the preparation of a polymer based on a dicarboxylic acid and a diamine by polycondensation with an extruder, in which a solid dicarboxylic acid/diamine mixture is first heated under autogenous pressure in a corotatory twin-screw extruder, and then the discharge is transferred into a corotatory twin-screw extruder, in which first residual water and water from the polycondensation are removed through venting orifices.

Dicarboxylic acids refer to the customary dicarboxylic acids, preference being given to adipic acid. As well as other diamines, hexamethylenediamine is specified as a preferred diamine. Particular preference is given to using hexamethylenediammonium adipate (AH salt).

EP-A-0 667 367 relates to partly aromatic copolyamide molding materials with high crystallinity. The polyamide molding materials are formed from dicarboxylic acids of diamines and comprise terephthalic acid, isophthalic acid, hexamethylenediamine and aliphatic cyclic diamines as base units. They are prepared continuously by passage through a tubular evaporator with downstream separator.

EP-A-0 693 515 relates to a process for preparing precondensates of partly crystalline or amorphous, thermoplastically processible, partly aromatic polyamides, wherein salts of the diamines and dicarboxylic acids are first prepared and are then converted in an autoclave with postcondensation.

In the batchwise preparation of partly aromatic polyamides, it is easy for the vessel to become blocked by deposits, for whose removal the plant has to be shut down. In addition, a uniform product is generally not obtained.

There is therefore a demand for a process for preparing partly aromatic copolyamides in which the formation of deposits in the tank or preparation apparatus can be avoided and homogeneous products are obtainable.

It is an object of the present invention to provide a process for continuously preparing partly aromatic copolyamides which works with low residence times and permits a high viscosity of the copolyamides. In addition, a very homogeneous product should be obtainable, and contamination of the apparatus should be avoided.

The object is achieved in accordance with the invention by a process for preparing a polyamide based on dicarboxylic acids and diamines in an extruder, which comprises heating a solid mixture comprising a monomer mixture composed of 50 mol % of dicarboxylic acid mixture composed of from 60 to 88% by weight of terephthalic acid and from 12 to 40% by weight of isophthalic acid, in which up to 20% by weight of the dicarboxylic acid mixture may also be replaced by other dicarboxylic acids, and 50 mol % of hexamethylenediamine which may be up to 20% by weight replaced by other $C_{2-30}$-diamines, in a corotatory twin-screw extruder for a residence time of from 10 seconds to 30 minutes, to a temperature in the range from 150 to 400° C. while removing steam and if appropriate diamines through venting orifices.

It has been found in accordance with the invention that partly crystalline and partly aromatic polyamides can be prepared in an extruder in an advantageous manner by heating and reacting a solid mixture of the starting monomers (generally in salt form). The use of an extruder achieves a short residence time, such that the formation of by-products can be effectively avoided or reduced. In addition, the extruder also allows the preparation of copolyamides with high viscosity without deposits being formed or the apparatus becoming blocked.

The process according to the invention proceeds from a solid mixture which comprises a monomer mixture. The solid mixture may also comprise further ingredients, such as fibers, fillers, dyes or assistants. Typically, the monomer mixture is present in salt form, the water formed in the salt formation in the extruder being removed substantially completely before the reaction. Remaining residual water can be removed through venting orifices in the extruder. Typical water contents for a solid monomer mixture are in the range from 5 to 30% by weight, preferably from 10 to 20% by weight, of the monomer mixture.

The monomer mixture consists of 50 mol % of dicarboxylic acid mixture and 50 mol % of diamine or diamine mixture. The dicarboxylic acid mixture consists of from 60 to 88% by weight of terephthalic acid and from 12 to 40% by weight of isophthalic acid. Preferably from 64 to 80% by weight, especially from 64 to 76% by weight, of terephthalic acid is present, which corresponds to preferably from 20 to 36% by weight and especially from 24 to 36% by weight of isophthalic acid. In addition, up to 20% by weight of dicarboxylic acid mixture may also be replaced by other dicarboxylic acids. This is preferably from 0 to 10% by weight, especially from 0 to 5% by weight. When some of the dicarboxylic acid mixture is replaced by other dicarboxylic acids, the lower limit of the other component is preferably at 0.5% by weight, especially at 1% by weight. Other suitable dicarboxylic acids are, for example, adipic acid, pimelic acid, suberic acid, azelaic acid and sebacic acid, and also 7-sulfoisophthalic acid.

The diamine component used is hexamethylenediamine which may be up to 20% by weight replaced by other $C_{2-30}$-diamines. Preferably from 0 to 10% by weight, especially from 0 to 5% by weight, of the hexamethylenediamine is replaced by other $C_{2-30}$-diamines. When other $C_{2-30}$-diamines are present, their minimum amount is preferably at 0.5% by weight, especially at least 1% by weight. Suitable further diamines are, for example, tetramethylenediamine, octamethylenediamine, decamethylenediamine and dodecamethylenediamine, and also m-xylylenediamine, bis(4-aminophenyl)methane, bis(4-aminophenyl)-2,2-propane and bis(4-aminocyclohexyl)methane, or mixtures thereof.

As an additional diamine, preference is given to using bis(4-aminocyclohexyl)methane, which is obtainable under the name Dicycan from BASF AG.

Apart from terephthalic acid, isophthalic acid and hexamethylenediamine, preference is given to using no other dicarboxylic acids or diamines.

According to the invention, the reaction is performed in a corotatory extruder which has venting orifices. Suitable extruders are known to those skilled in the art and are described, for example, in DE-A-195 14 145.

The residence time in the extruder is from 10 seconds to 30 minutes, preferably from 10 seconds to 20 minutes, especially from 30 seconds to 5 minutes.

The reaction is effected at a temperature in the range from 150 to 400° C., preferably from 200 to 330° C. The temperature may especially be from 250 to 330° C., especially from 260 to 330° C.

The pressure in the extruder is established of its own accord and is additionally also adjusted via the proportion of water vapor and diamine removed via the venting orifices.

The diamine and water removed from the venting orifices are preferably condensed at least partly, and the diamine thus obtained is recycled into the extruder. For example, the discharges from the venting orifices can be combined and separated in a column, in which case water vapor is drawn off via the top, while a diamine/water condensate is discharged in the bottom and recycled into the extruder.

According to the invention, it is possible to carry out compounding with fibers, fillers, dyes or assistants directly in the extruder. To this end, the fibers, fillers, dyes, assistants or mixtures thereof are fed directly to the extruder in addition to the monomer mixture. This allows further processing steps to be saved.

The inventive extrusion may be followed by further processing steps, such as a solid-phase postcondensation and a granulation step. These processes are known per se and are described, for example, in the literature cited at the outset.

Fibers and fillers are listed, for example, in EP-A-0 667 367 as component (B). To prepare polyamide blends, it is also possible, for example, to add rubber-elastic polymers. These are described in EP-A-0 667 367 as component (C).

Customary additives such as stabilizers and oxidation retardants, agents against thermal decomposition, decomposition through ultraviolet light, lubricants and demolding agents, dyes, pigments and plasticizers are described in EP-A-0 667 367. The polyamides prepared in accordance with the invention preferably have a glass transition temperature in the range from 110 to 150° C. and a melting point in the range from 280 to 320° C. They preferably have a crystallinity of more than 20% and are not transparent.

The monomer mixture can be prepared, for example, by drying aqueous monomer solutions, by precipitation while reducing the temperature, or by devolatilizing a portion of the water or by mixing separate salts.

The invention is illustrated in detail by the examples which follow.

EXAMPLES

Example 1

368.57 g of water were admixed with 196.07 g of hexamethylenediamine (HMD) solution (69.8% in water, BASF), 9.78 g of Dicycan (BASF), 141.58 g of terephthalic acid, 61.78 g of isophthalic acid (Lonza) in a plastic vessel at 90° C.

The resulting solution was finally poured into an aluminum dish and cooled to 50° C. On attainment of 40° C., the moist salt was dried under vacuum ($N_2$ stream) at 40° C. for one night.

The salt was extruded in a DSM midi extruder at external temperature 330° C. and 80 rpm (bypass closed).

The values of Tm, Tg, TkB, dH, VN were subsequently measured for the resulting copolyamide.

Examples 2 to 5

Example 1 was repeated, with the difference that the polymer melt was not discharged immediately. The bypass was opened for a certain time (=residence time), then the polymer was discharged.

| Example | Residence time [min] | VN [ml/g] | AEG [mmol/g] | $Tg_2$ [° C.] | $Tm_2$ [° C.] | $T_{kb}$ [° C.] | $dH_2$ [° C.] |
|---|---|---|---|---|---|---|---|
| 1 | 0 | 9.6 | 651 | 114 | 305 | 289 | 45 |
| 2 | 1 | 19 | 139 | 124 | 307/322 | 291 | 50 |
| 3 | 3 | 24 | 39 | 124 | 309/327 | 291 | 44 |
| 4 | 6 | 27.7 | 35 | 125 | 311/326 | 290 | 52 |
| 5 | 20 | 29.7 | 38 | 125 | 305/322 | 290 | 68 |

The relative low VN can be explained by an HMD loss. Higher VN can be achieved in a simple manner by adding HMD or recycling the vapor.

The invention claimed is:

1. A process for preparing a polyamide based on dicarboxylic acids and diamines in an extruder, which comprises heating a solid monomer mixture, wherein the water content is 10-20% by weight, of the monomer mixture, composed of 50 mol % of dicarboxylic acid mixture composed of from 60 to 88% by weight of terephthalic acid and from 12 to 40% by weight of isophthalic acid, in which up to 20% by weight of the dicarboxylic acid mixture may also be replaced by other dicarboxylic acids, and 50 mol % of hexamethylenediamine which may be up to 20% by weight replaced by other $C_{2-30}$-diamines, in a corotatory twin-screw extruder for a residence time of from 10 seconds to 30 minutes, to a temperature in the range from 150 to 400° C. while removing steam and optionally diamines through venting orifices.

2. The process according to claim 1, wherein the mixture is heated to a temperature in the range from 200° C. to 330° C.

3. The process according to claim 1, wherein the diamines and water removed from the venting orifices are condensed at least partly, and the diamines thus obtained is recycled into the extruder.

4. The process according to claim 1, wherein the residence time is from 30 seconds to 5 minutes.

5. The process according to claim 1, wherein fibers, fillers, dyes, assistants or mixtures thereof are fed directly to the extruder for compounding in addition to the monomer mixture.

6. The process according to claim 1, wherein the extrusion is followed by a solid-phase postcondensation and a granulation step.

7. The process according to claim 1, wherein the dicarboxylic acid mixture consists of from 64 to 80% by weight of terephthalic acid and from 20 to 36% by weight of isophthalic acid, wherein 0 to 5% by weight of the dicarboxylic acid mixture may be replaced by other dicarboxylic acids.

* * * * *